3,123,612
Patented Mar. 3, 1964

3,123,612
2-ACYLATED 2,3-DIHYDRO-1H-PYRROLO-[3,4-c]PYRIDINES
Shreekrishna M. Gadekar, Valley Cottage, and James R. Vaughan, Jr., New City, N.Y., and Selby B. Davis, Greenwich, Conn., assignors to American Cyanamid Company, New York, N.Y., a corporation of Maine
No Drawing. Filed Mar. 14, 1961, Ser. No. 95,510
8 Claims. (Cl. 260—295)

This invention relates to certain 2-acylated 2,3-dihydro-1H-pyrrolo[3,4-c]pyridines and, more particularly, is concerned with novel compounds which may be represented by the following general formula:

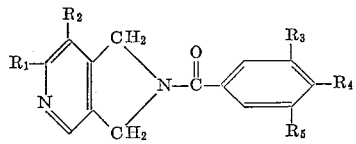

wherein $R_1$ is hydrogen or a methyl radical; $R_2$ is hydrogen or a halogen, hydroxy, lower alkoxy, amino or substituted amino radical; and $R_3$, $R_4$ and $R_5$ are lower alkoxy. Suitable lower alkoxy substituents are methoxy and ethoxy.

The organic bases of this invention form non-toxic, acid-addition salts with a variety of organic and inorganic salt-forming agents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic and the like. For purposes of this invention, the free bases are equivalent to their non-toxic acid addition salts.

The novel compounds of the present invention are, in general, white crystalline solids, somewhat soluble in polar solvents such as water, methanol, ethanol, acetone and dimethylformamide; but relatively insoluble in non-polar solvents such as ether, benzene, petroleum ether, methylene chloride, and the like.

The novel compounds of the present invention are valuable hypotensive agents of low toxicity and may be administered orally or parenterally. When so administered to mammals, they have been found to be useful in amounts ranging from about 1 to about 50 milligrams per kilogram of body weight. It is not known with certainty the manner in which these new compounds function as hypotensive agents. It is an established fact, however, that the novel compounds of the present invention have the ability to lower the blood pressure in mammals to a striking degree.

The novel compounds of the present invention may be readily prepared by the interaction of an appropriate 2,3-dihydro-1H-pyrrolo[3,4-c]pyridine with a reactive derivative of a 3,4,5-trialkoxybenzoic acid, such as the acid halide, acid anhydride or lower alkyl ester. The intermediate 2,3-dihydro-1H-pyrrolo[3,4-c]pyridines corresponding to the following general formula:

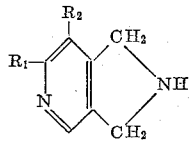

wherein $R_1$ is hydrogen or methyl, and $R_2$ is hydrogen, halogen, hydroxy, lower alkoxy, amino or substituted amino are known in the art and readily prepared by standard procedures.

The conversion of the 3,4,5-trialkoxybenzoic acids to the corresponding acid halides may be carried out by means of various reagents. For this purpose there may be used phosphorus trichloride, phosphorus tribromide, phosphorus pentachloride, phosphorus pentabromide, phosphorus oxychloride, sulfuryl chloride or thionyl chloride. However, we prefer to use thionyl chloride for the preparation of the corresponding intermediate acid chlorides. The reaction may be carried out at temperatures ranging from about 20° C. to about 100° C. in the absence of a solvent or in a solvent which will not enter into the reaction under the conditions employed. Such solvents may be, for example, chloroform, methylene chloride, benzene, and the like. The resulting acid halide is then treated with the appropriate 2,3-dihydro-1H-pyrrolo[3,4-c]pyridine whereby the corresponding amide is obtained. This reaction may be carried out at temperatures ranging from about 0° C. to about 100° C. For convenience, it is preferred to carry out the reaction in a solvent which will not enter into the reaction under the conditions employed. Solvents which may be used are, for example, benzene, toluene, tetrahydrofuran, chloroform, and the like. An acid acceptor such as an alkali metal hydroxide, pyridine, or triethylamine may also be employed.

The conversion of the 3,4,5-trialkoxybenzoic acids to the corresponding acid anhydrides may be readily achieved by the interaction of a 3,4,5-trialkoxybenzoic acid with its corresponding acid halide. The resulting acid anhydride is then treated with an appropriate 2,3-dihydro-1H-pyrrolo[3,4-c]pyridine whereby the corresponding amide is obtained. This reaction may be carried out at temperatures ranging from about 50° C. to about 100° C. Solvents which may be used are, for example, chloroform, toluene, tetrahydrofuran, and the like.

The lower alkyl esters of the 3,4,5-trialkoxybenzoic acids may be readily prepared by standard esterification procedures. The amidation of these intermediate esters may be brought about by treatment with an appropriate 2,3-dihydro-1H-pyrrolo[3,4-c]pyridine under conditions well known in the art.

The invention will be described in greater detail in conjunction with the following specific examples.

EXAMPLE 1

*6-Methyl-7-Amino-2-(3,4,5-Trimethoxybenzoyl)-2,3-Dihydro-1H-Pyrrolo[3,4-c]Pyridine*

In 62 ml. of 1 N sodium hydroxide was dissolved 4.4 g. (0.02 mole) of 6-methyl-7-amino-2,3-dihydro-1H-pyrrolo[3,4-c]pyridine dihydrochloride and 4.6 g. (0.02 mole) of 3,4,5-trimethoxybenzoyl chloride. The reaction mixture was stirred at room temperature for 2 hours and then the solids were removed by filtration. The solids were washed on the filter with ice-water, air dried, and recrystallized from ethanol. There was thus obtained 6.5 g. (95% yield) of 6-methyl-7-amino-2-(3,4,5-trimethoxybenzoyl)-2,3-dihydro-1H-pyrrolo[3,4-c]pyridine, M.P. 237–238° (dec.).

EXAMPLE 2

*6-Methyl-7-Methoxy-2-(3,4,5-Trimethoxybenzoyl)-2,3-Dihydro-1H-Pyrrolo[3,4-c]Pyridine*

To a solution of 1.8 g. (0.0076 mole) of 6-methyl-7-methoxy-2,3-dihydro-1H-pyrrolo[3,4-c]pyridine dihydrochloride in 25 ml. of 1 N sodium hydroxide was added 1.7 g. (0.0076 mole) of 3,4,5-trimethoxybenzoyl chloride. The reaction mixture was stirred at room temperature for 2 hours and then the solids were removed by filtration. The solids were washed on the filter with ice-water, air dried, and recrystallized from ethanol. There was thus obtained 2.3 g. (84% yield) of 6-methyl-7-methoxy - 2 - (3,4,5 - trimethoxybenzoyl) - 2,3 - dihydro-1H-pyrrolo[3,4-c]pyridine, M.P. 184–186° (dec.).

EXAMPLE 3

*6-Methyl-7-Chloro-2-(3,4,5-Trimethoxybenzoyl)-2,3-Dihydro-1H-Pyrrolo[3,4-c]Pyridine*

To a solution of 2.4 g. (0.01 mole) of 6-methyl-7-chloro-2,3-dihydro-1H-pyrrolo[3,4-c]pyridine dihydrochloride in 31 ml. of 1 N sodium hydroxide was added 2.3 g. (0.01 mole) of 3,4,5-trimethoxybenzoyl chloride. The reaction mixture was stirred at room temperature for 2 hours and then the solids were removed by filtration. The solids were washed on the filter with ice-water, air dried, and recrystallized from aqueous ethanol using decolorizing charcoal. There was thus obtained 2.6 g. (72% yield) of 6-methyl-7-chloro-2-(3,4,5-trimethoxybenzyl)-2,3-dihydro-1H-pyrrolo[3,4-c]pyridine, M.P. 156–157° C.

EXAMPLE 4

*6-Methyl-7-Bromo-2-(3,4,5-Trimethoxybenzoyl)-2,3-Dihydro-1H-Pyrrolo[3,4-c]Pyridine*

To a solution of 2.9 g. (0.01 mole) of 7-bromo-6-methyl-2,3-dihydro-1H-pyrrolo[3,4-c]pyridine dihydrochloride in 31 ml. of 1 N sodium hydroxide was added 2.3 g. (0.01 mole) of 3,4,5-trimethoxybenzoyl chloride. The reaction mixture was stirred for 2 hours at room temperature and then the solids were removed by filtration. This was recrystallized from aqueous ethanol using decolorizing charcoal. There was thus obtained 3.0 g. (72% yield) of 6-methyl-7-bromo-2-(3,4,5-trimethoxybenzoyl)-2,3-dihydro-1H-pyrrolo[3,4-c]pyridine, M.P. 144–145° C.

EXAMPLE 5

*6-Methyl-2-(3,4,5-Trimethoxybenzoyl)-2,3-Dihydro-1H-Pyrrolo[3,4-c]Pyridine*

To a solution of 1.0 g. (0.005 mole) of 6-methyl-2,3-dihydro-1H-pyrrolo[3,4-c]pyridine dihydrochloride in 16 ml. of 1 N sodium hydroxide was added 1.2 g. (0.005 mole) of 3,4,5-trimethoxybenzoyl chloride. The reaction mixture was stirred at room temperature for 2 hours and then the solids were removed by filtration. The solids were washed on the filter with ice-water, air dried, and recrystallized from aqueous ethanol. There was thus obtained 1.2 g. (72%) of 6-methyl-2-(3,4,5-trimethoxybenzoyl)-2,3-dihydro-1H-pyrrolo[3,4-c]pyridine, M.P. 185–186° C.

EXAMPLE 6

*7-Amino-2-(3,4,5-Trimethoxybenzoyl)-2,3-Dihydro-1H-Pyrrolo[3,4-c]Pyridine*

To a solution of 1.0 g. (0.0048 mole) of 7-amino-2,3-dihydro-1H-pyrrolo[3,4-c]pyridine dihydrochloride in a solution of 0.5 ml. of 1 N sodium hydroxide and 5 ml. of water was added 1.1 g. (0.0048 mole) of 3,4,5-trimethoxybenzoyl chloride. The reaction mixture was stirred at room temperature for 2 hours and then the solids were removed by filtration. The solids were washed on the filter with ice-water, air dried, and recrystallized from aqueous ethanol. There was thus obtained 0.75 g. (47% yield) of 7-amino-2-(3,4,5-trimethoxybenzoyl)-2,3-dihydro-1H-pyrrolo[3,4-c]pyridine, M.P. 230–233° C. (dec.).

EXAMPLE 7

*6-Methyl-7-Amino-2-(3,4,5-Triethoxybenzoyl)-2,3-Dihydro-1H-Pyrrolo[3,4-c]Pyridine*

To a solution of 2.2 g. (0.01 mole) of 6-methyl-7-amino-2,3-dihydro-1H-pyrrolo[3,4-c]pyridine dihydrochloride in 31 ml. of 1 N sodium hydroxide was added 2.7 g. (0.01 mole) of 3,4,5-trimethoxybenzoyl chloride. The reaction mixture was stirred at room temperature for 2 hours and then the solids were filtered off, washed with ice-water, air dried, and recrystallized from ethanol. There was thus obtained 3.3 g. (84%) of 6-methyl-7-amino - 2 - (3,4,5 - triethoxybenzonyl) - 2,3 - dihydro-1H-pyrrolo[3,4-c]pyridine, M.P. 204–205° (dec.).

What is claimed is:

1. A compound:

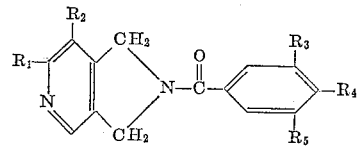

wherein $R_1$ is selected from the group consisting of hydrogen and methyl, $R_2$ is selected from the group consisting of hydrogen, halogen, hydroxy, lower alkoxy, and amino, and $R_3$, $R_4$, and $R_5$ are lower alkoxy.

2. The compound 6-methyl-7-amino-2-(3,4,5-trimethoxybenzoyl)-2,3-dihydro-1H-pyrrolo[3,4-c]pyridine.
3. The compound 6-methyl-7-methoxy-2-(3,4,5-trimethoxybenzoyl)-2,3-dihydro-1H-pyrrolo[3,4-c]pyridine.
4. The compound 6-methyl-7-chloro-2-(3,4,5-trimethoxybenzoyl)-2,3-dihydro-1H-pyrrolo[3,4-c]pyridine.
5. The compound 6-methyl-7-bromo-2-(3,4,5-trimethoxybenzoyl)-2,3-dihydro-1H-pyrrolo[3,4-c]pyridine.
6. The compound 6-methyl-2-(3,4,5-trimethoxybenzoyl)-2,3-dihydro-1H-pyrrolo[3,4-c]pyridine.
7. The compound 7-amino-2-(3,4,5-trimethoxybenzoyl)-2,3-dihydro-1H-pyrrolo[3,4-c]pyridine.
8. The compound 6-methyl-7-amino-2-(3,4,5-triethoxybenzoyl)-2,3-dihydro-1H-pyrrolo[3,4-c]pyridine.

References Cited in the file of this patent

UNITED STATES PATENTS

| | | |
|---|---|---|
| 2,767,191 | Wright | Oct. 16, 1956 |
| 2,852,520 | Robinson | Sept. 16, 1958 |
| 3,027,988 | Semb et al. | June 5, 1962 |

OTHER REFERENCES

Noller: Chemistry of Organic Compounds, 2nd ed., pp. 244–5 (1957).

Wright et al.: JACS, vol. 79, pp. 2199–2203 (1957).

Cram and Hammond: Organic Chemistry, pp. 540–45, McGraw-Hill (1959).